April 14, 1953 A. E. RIDEOUT ET AL 2,634,874
SHIPPING CASE UNLOADING APPARATUS
Filed Aug. 17, 1949 10 Sheets-Sheet 1

Fig. 1.

INVENTORS
ARTHUR E. RIDEOUT
JOHN HERBERT MOSLEY
BY EDGAR ARDELL

Pennie, Edmonds, Morton and Barrows
ATTORNEYS

April 14, 1953 — A. E. RIDEOUT ET AL — 2,634,874
SHIPPING CASE UNLOADING APPARATUS
Filed Aug. 17, 1949 — 10 Sheets-Sheet 4

INVENTORS
ARTHUR E. RIDEOUT
JOHN HERBERT MOSLEY
EDGAR ARDELL
BY
ATTORNEYS

April 14, 1953 A. E. RIDEOUT ET AL 2,634,874
SHIPPING CASE UNLOADING APPARATUS
Filed Aug. 17, 1949 10 Sheets-Sheet 6

INVENTORS
ARTHUR E. RIDEOUT
JOHN HERBERT MOSLEY
EDGAR ARDELL
BY
Pennie, Edmonds, Morton & Barrows
ATTORNEYS Patented Apr. 14, 1953

2,634,874

UNITED STATES PATENT OFFICE 2,634,874

SHIPPING CASE UNLOADING APPARATUS

Arthur E. Rideout, Chicago, Ill., and Edgar Ardell, Middletown, and John Herbert Mosley, Portland, Conn., assignors to Emhart Manufacturing Company, a corporation of Delaware Application August 17, 1949, Serial No. 111,452

15 Claims. (Cl. 214—309)

This invention relates to apparatus for unloading shipping cases or trays such as are used for containers, including bottles, glass jars, paper or metal cans or other articles. It relates to apparatus for the unloading of shipping cases which entirely enclose the articles, and which are provided with folded flap extensions of the side and end walls to form the tops and bottoms of the cases, as well as to apparatus for removing articles from open trays of less height than the articles. The former type of shipping case is usually made of corrugated board or fiber board, or the like, whereas the latter type may be made of wood, metal, or other materials.

In certain industries, such as the food product industry, it is customary for the manufacturer of the containers to ship the empty containers to the food product manufacturer in the shipping cases in which the product is to be shipped to the customer. These shipping cases, properly printed as specified by the food manufacturer are filled with the empty food containers and shipped to the product manufacturer with the tops of the cases unsealed, the flaps being merely folded to closed position. When the food manufacturer receives these cases the containers are removed, cleansed, if necessary, filled with the product, closed, labeled and then repacked in the same shipping cases.

The object of the invention is to provide an unloading apparatus which will remove the articles from the cases or trays without damage to the articles or the trays and at a rate commensurate with the quantity of filled cases which come into the plant day by day.

Another object of the invention is to provide an unloader which will deliver the articles either in groups for single-lining in a converger, or in a plurality of rows or lines corresponding to those of the case.

Another object of the invention is to provide an unloading apparatus which when once set in operation by the operator of the machine will automatically carry out the required steps of operation and deliver both the empty tray and the articles to separate off-bearing conveyors.

Another object of the invention is to provide an apparatus which will unload articles from either the type of case which is higher than the articles, or the type where the bottles project above the top.

Other objects and advantages of the invention will be apparent as it is better understood by the accompanying drawings illustrating two embodiments of the invention by way of example.

The first of these embodiments is apparatus for unloading shipping cases filled with wide mouthed jars which are in extensive use as containers for food products, such as cheese, baby food, etc., the jars being delivered to the off-bearing conveyor in groups. In the second embodiment the apparatus is constructed and arranged to operate on shipping cases filled with bottles, and the bottles are delivered in rows.

Referring now to the accompanying drawings:

Figs. 19-25 inclusive illustrate a modified form of the unloading apparatus;

The present apparatus briefly described, comprises a suitable framework 1 (Fig. 1) at the upper portion of which a gripper head indicated generally by numeral 2 is mounted in stationary fixed position. This gripper head includes devices for individually supporting the twenty-four open mouth jars 3 (Fig. 13) which constitute the charge. The cases have top, side and end flaps, as shown, and come to the apparatus on a conveyor 4 (Fig. 3) with such flaps folded over the top of the charge.

Figures 4, 5, 6:
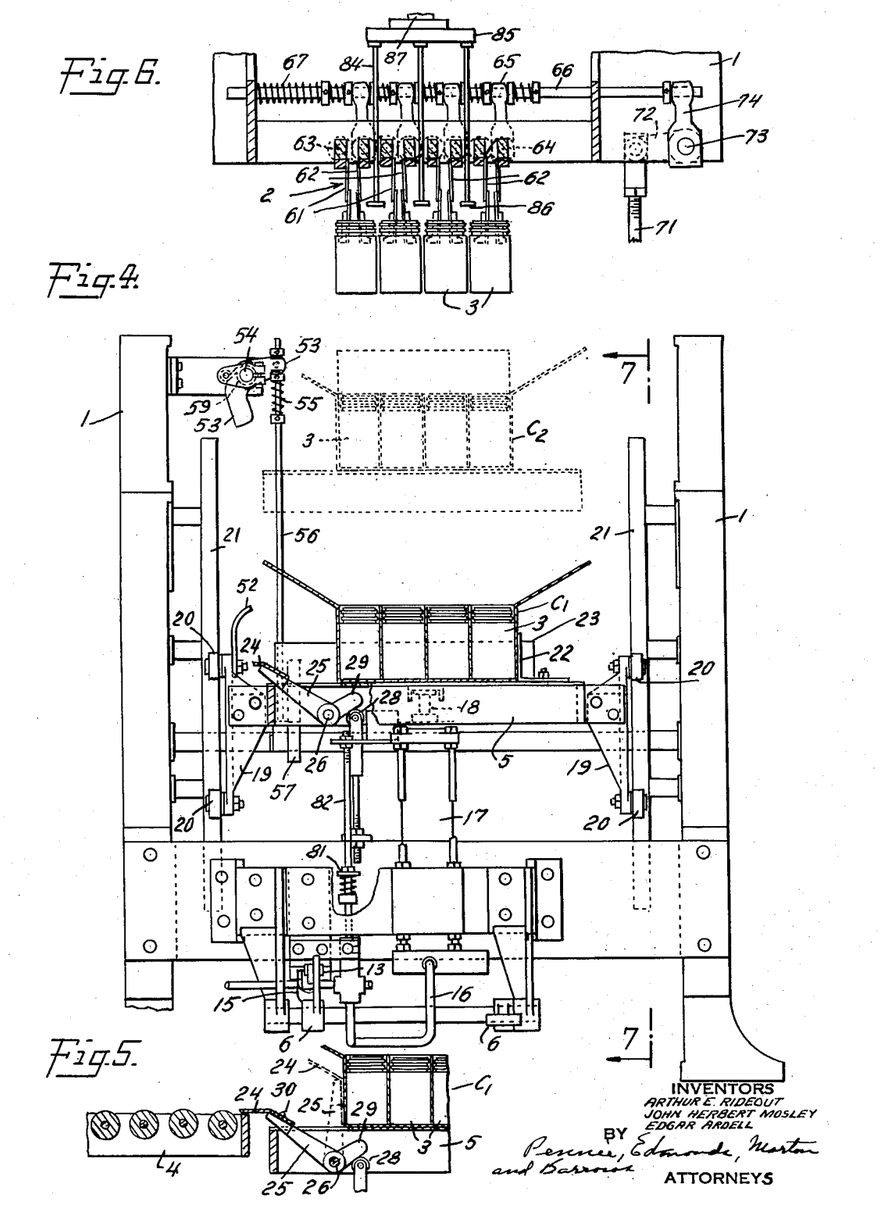
Fig. 4 is a partial elevation looking in the direction of the arrows 4—4 of Fig. 1.
Fig. 5 is a detail section taken on line 5—5 of Fig. 3.
Fig. 6 is a fragmentary view of the jar-gripping mechanism, showing the position of the parts when supporting the jars.

The machine operator opens and spreads these flaps by hand and inspects the contents to see that the open end mouths are all facing up. The operator then moves the case to position $C_1$ on a case supporting table 5 which rises by depressing a foot lever 6 to lift the case with its charge of jars into its upper or charge-engaging position $C_2$ with respect to the gripper head 2. Then the gripping devices are operated to grip or support the jars, and case table 5 is lowered to return the case to its original position $C_1$. The jars are now suspended from the gripper head as shown in Fig. 6 free of the case.

Substantially simultaneously with the descent of table 5, stripping devices descend between the article gripping devices and, if there is any tendency for the jars to stick in the case or in the partitions 8, which are of the criss-cross type forming individual cells for the jars, both the case and the partitions are forced free of the jars with a positive action so that there will be no delay in operation at this point. An off-bearing conveyor 9 for the jars is arranged at the right of gripper head 2 and case table 5 (Fig. 1) and at an elevation which is approximately level with the bottoms of the jars 3 when held in suspended position on the gripper head.

For the purpose of removing the jars from the gripper head and delivering them to conveyor 9 an article removing carriage indicated generally by reference numeral 10 is provided. The raising and lowering movements of case table 5 previously referred to take place while carriage 10 is in the position shown in Fig. 17 adjacent conveyor 9. After the charge of jars has been gripped by the gripper head 2 and table 5 has been lowered to its initial position, carriage 10 moves toward the left (Fig. 1) into receiving position immediately below the bottoms of the jars (Fig. 18). The forward end of carriage 10 ejects the empty case from table 5 onto an off-bearing conveyor 7.

The gripping devices of gripper head 2 are now actuated to release the charge of articles, which fall by gravity onto carriage 10, and this carriage moves back to its former position during which the jars are moved onto a flat plate 11 which forms a part of an article receiving trough 12. The charge of articles is left on this plate and the cycle of operation is repeated thus moving another charge of articles onto plate 11 and this moves the first charge ahead onto conveyor 9. Appropriate cyclic operating mechanism is provided for effecting the operation of the various parts of the apparatus in proper sequence.

Figures 7, 8, 9, 10:
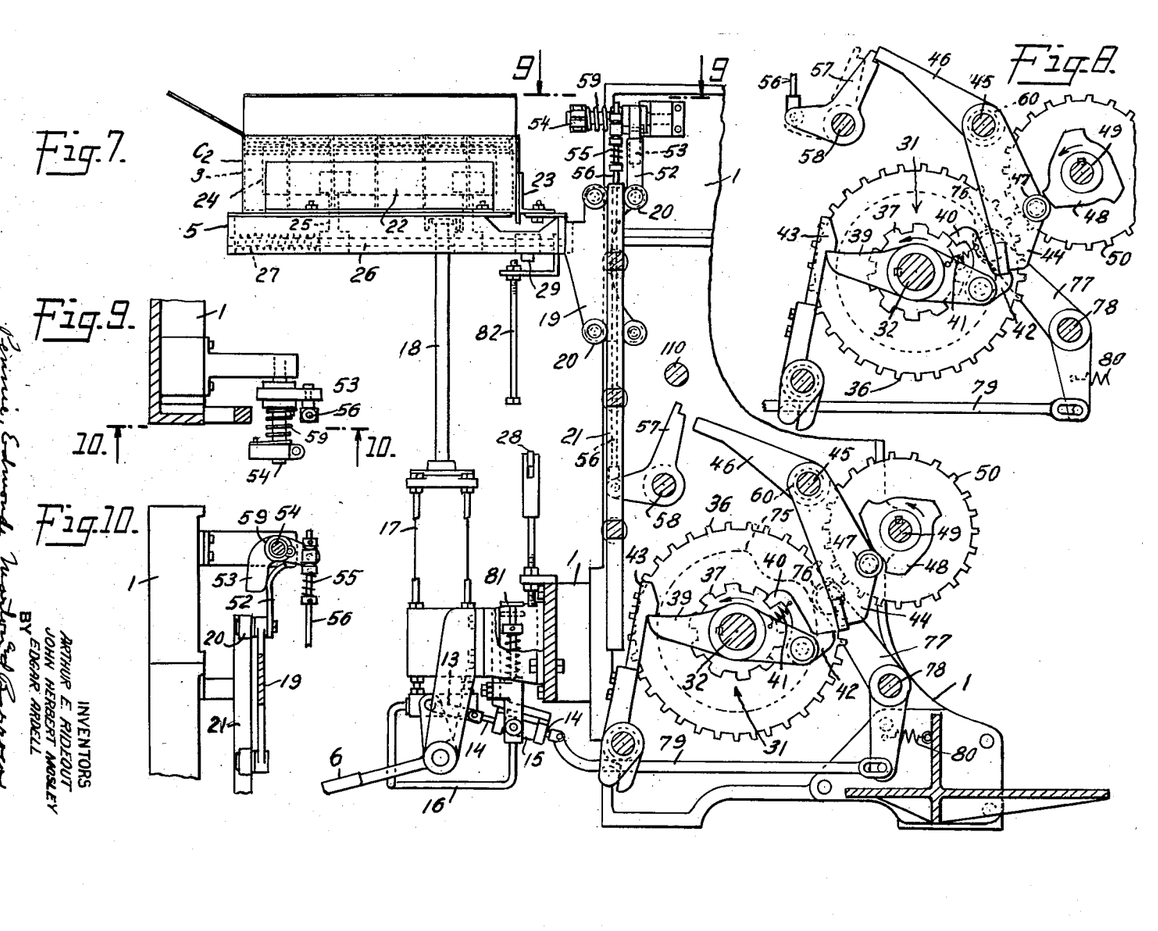
Fig. 7 is a vertical longitudinal section taken on line 7—7 of Figs. 3 and 4.
Fig. 8 is a sectional view showing certain parts of Fig. 7 in a different position.
Fig. 9 is a detail horizontal section taken on line 9—9 of Fig. 7.
Fig. 10 is a detail vertical section taken on line 10—10 of Fig. 9.

Now taking up the construction and operation of the various parts of the apparatus, foot member 6 is connected through a link 13 to the valve spool 14 of an air valve 15 so that when this lever is depressed to the position shown in Fig. 7 it opens air valve 15 and allows air to flow from an appropriate pressure source (not shown) through a pipe 16 to an air cylinder 17 whose piston rod 18 engages the bottom of case table 5 and raises the table to its upward position. Case table 5 is not supported entirely by piston rod 18, but upon two carriages 19, each of which is provided with four rollers 20 arranged in pairs and rolling on the opposite sides of two vertical bars or rails 21.

Figure 3:
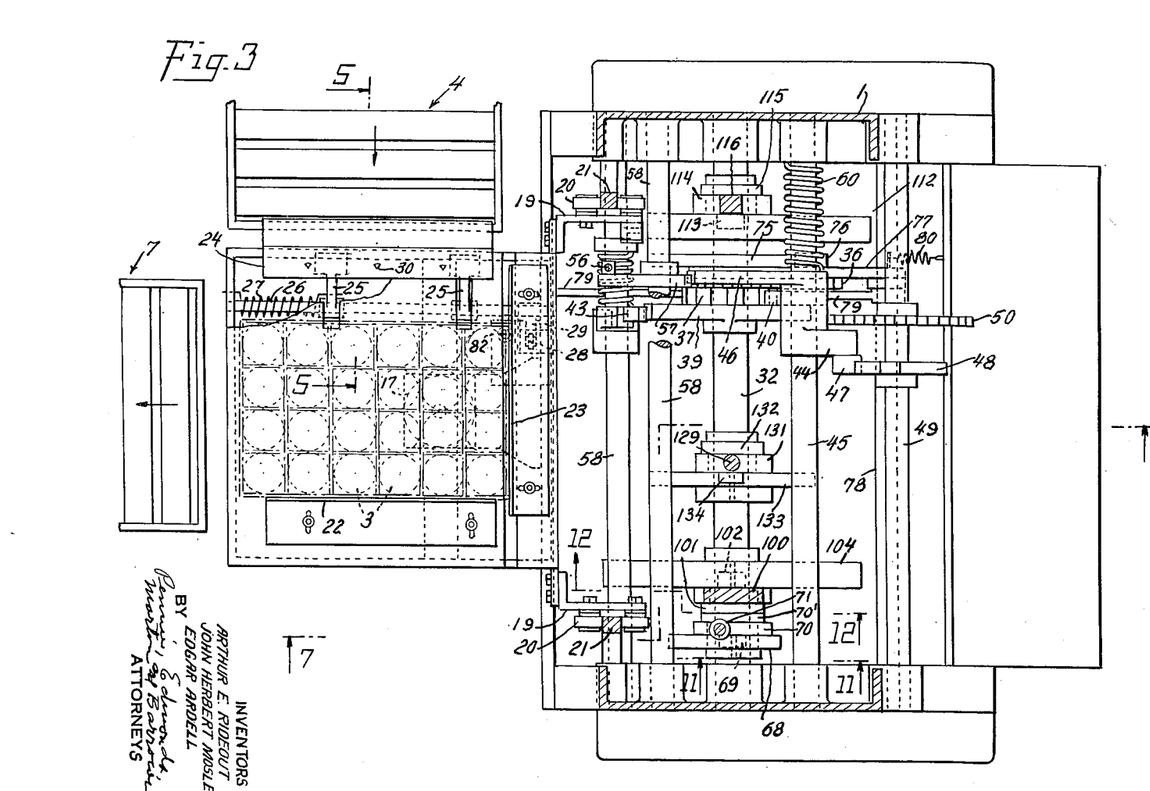
Fig. 3 is a view in horizontal section taken on line 3—3 of Fig. 1.

The filled case is positioned on table 5 by means of two adjustable guides 22 and 23 (Fig. 3) in the form of angle bars and against which one side and end of the case are placed by the operator. As the operator moves the case by hand from incoming conveyor 4 onto table 5 the case slides over a scuff plate (plate 24, Figs. 3 and 5) which is carried on two spaced arms 25. These arms are fixed to a pivoted shaft 26 mounted for rocking movement on table 5 and normally biased to the dotted position of Fig. 5 by means of a heavy torsion spring 27 (Fig. 3). However, when the case table is in the lower position, a roller 28 on the upper end of an adjustable fixed bar engages a short arm 29 fixed to shaft 26 and rocks arms 25 to the full line position of Fig. 5 so that plate 24 may serve as the scuff plate referred to. As soon as table 5 begins its upward movement arm 29 is released from roller 28 and the device moves into the dotted position of Fig. 5 for the purpose of firmly clamping the case against guide 22. To facilitate this the surface of plate 24 which engages the side of the case may be roughened or provided with projecting points 30.

The cyclic mechanism for controlling the operation of the apparatus comprises a one-revolution clutch indicated generally by numeral 31. The purpose of this clutch is to cause a main cam shaft 32 to rotate one revolution at a time, the construction and arrangement of the cams on this shaft being such that one revolution thereof operates the machine through one complete cycle. Power for operating one-revolution clutch 31, and the entire machine, is supplied by means of an electric motor 33 (Fig. 1) which is belted to a speed reducer 34.

The slow speed shaft of this speed reducer carries two sprockets, one of which drives through a chain 35, a large sprocket 36 which is keyed to the hub of a toothed wheel 37 (Figs. 2 and 7), the driving member of the clutch. These parts rotate together and rotate continuously but are mounted loosely on a bushing 38 surrounding and keyed to cam shaft 32. Driven member 39 of the clutch is a two-armed member keyed to shaft 32, one arm thereof having a driving dog 40 pivoted thereto and biased into engagement with the teeth of toothed wheel 37 by means of a tension spring 41.

Clutch 31 is tripped by releasing the tail portion 42 of dog 40 which allows the dog to engage one of the teeth of wheel 37 and thus start the rotation of shaft 32. At the end of a 360 degree movement of driven member 39 and shaft 32, tail 42 is again engaged thus withdrawing dog 40 from toothed wheel 37 and stopping the rotation of the shaft. At this instant a spring biased latch 43 snaps by the end of the second arm of driven member 39 and prevents rebound or backlash.

The control of tail 42 of driving dog 40 is by means of a clutch dog lever 44 which is pivoted on cross shaft 45 and which is rocked to swing its lower end out of or into engagement with tail 42 (Figs. 7 and 8). Integral with clutch dog lever 44 is a catch arm 46 which extends upwardly to the left of shaft 45, and mounted on lever 44 is a roller 47 which cooperates with a three-lobed cam 48. Cam 48 is keyed to a continuously rotating cross shaft 49 which is driven by means of a sprocket 50 and chain 51 (Fig. 1) from the second sprocket on the slow speed shaft of speed reducer 34.

The tripping of the clutch 31 is accomplished by the combined action of the upward movement of case table 5 and three-lobed cam 48. When table 5 reaches the upper end of its stroke a cam bar 52 (Figs. 4 and 7) which is fixed on one of the carriages 19 which supports table 5 engages the vertical portion of a right-angled lever 53 and swings it to the left (Figs. 4 and 10). Lever 53 is pivoted on a horizontal rod 54 which is fastened to a bracket mounted on frame 1. The horizontal portion of lever 53 compresses a coil spring 55 which is mounted at the upper end of a link rod 56 between a pair of collars attached to this rod.

The lower end of rod 56 is connected to a horizontal arm on a catch lever 57 which is pivoted on a cross shaft 58 and which controls the clutch 31 through co-action with the upper end of catch arm 46. Catch lever 57 is normally biased toward engagement with catch arm 46 through the action of a torsion spring 59 on rod 54 which biases right angled lever 53 in the counterclockwise direction (Fig. 4) thus tending to lift link rod 56. However, the engagement of lever 53 by cam bar 52 has overcome spring 59 and compressed spring 55.

The friction between the shoulder on catch lever 57 and the lower surface of catch arm 46 will prevent movement of catch lever 57 until one of the lobes of cam 48 engages roller 47 and lifts catch arm 46 from catch lever 57 slightly as shown in Fig. 8 (full line position). Then catch lever 57 moves away from catch arm 46 (dotted position of Fig. 8), and roller 47 is allowed to follow the contour of cam 48, being urged against the cam by the action of a torsion spring 60 which surrounds shaft 45 (Fig. 3). As roller 47 follows cam 48 the lower end of clutch dog lever 44 is swung to the right (Fig. 7), thus releasing tail 42 and tripping the clutch. Lever 44 is immediately reset in the path of tail 42 by contact of the next lobe of cam 48 with roller 47.

Figure 2:
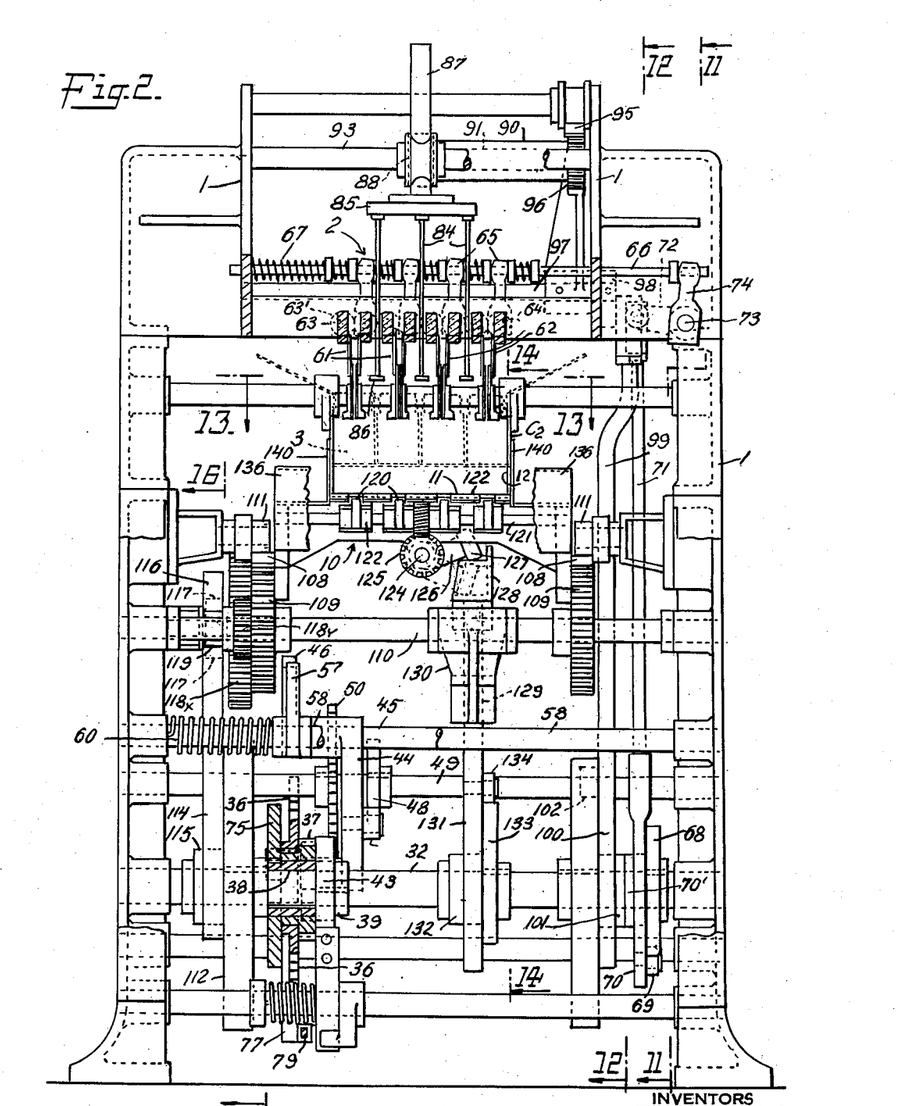
Fig. 2 is a vertical transverse section taken on broken line 2—2 of Fig. 1.

Thus, main cam shaft 32 is started for one revolution and one cycle of operation of the apparatus. The first action to take place is the actuation of the jar gripping devices of gripper head 2 so as to grip and hold the charge of jars 3 which have been elevated into position to be engaged by these devices. The gripping devices comprise a series of pairs of downwardly directed resilient arms 61 and 62, one pair entering the open mouth of each of the jars 3 (Fig. 2). These arms are equipped at their lower ends with resilient (rubber) pads shaped to engage the interior of the jars just below their necks.

The upper ends of resilient arms 61 and 62 are mounted on a series of closely spaced parallel shafts, arms 61 being mounted on alternate shafts 63 and arms 62 being mounted on the intermediate shafts 64. Appropriate mechanism is provided for rocking shafts 63 and 64 simultaneously so as to spread arms 61 and 62 in each jar as shown in Fig. 6 where the jars 3 are individually and firmly held in suspended position.

Figure 1:
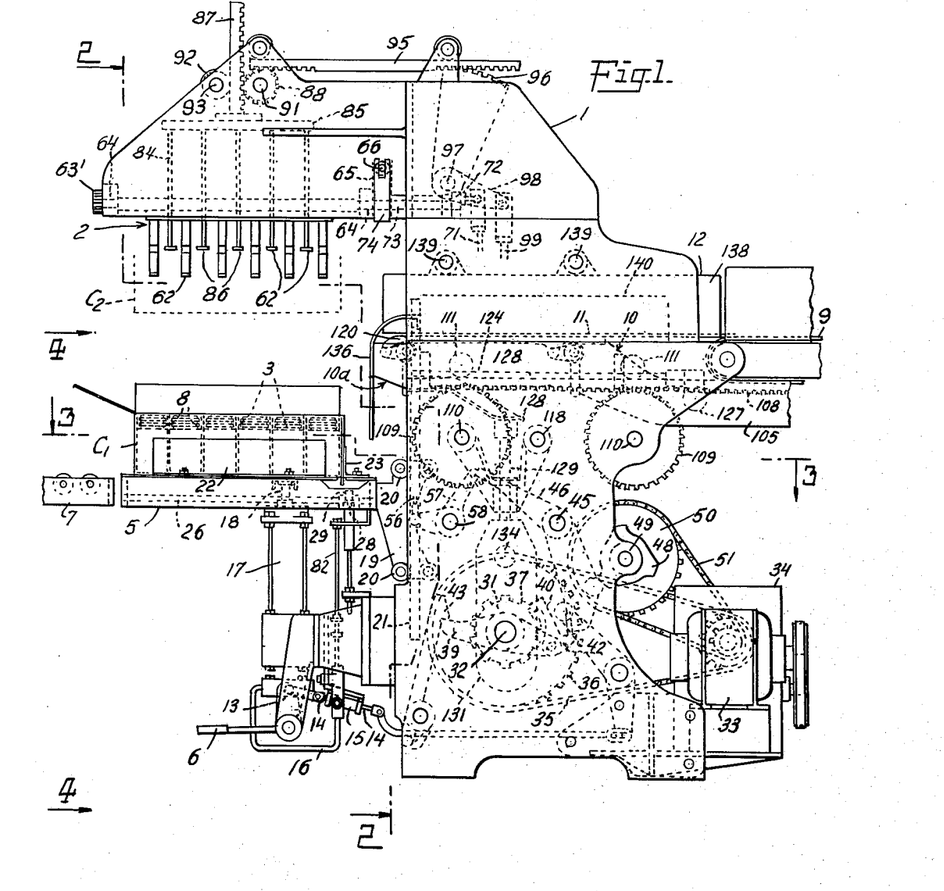
Fig. 1 is a view of the unloading apparatus in side elevation.

The operating mechanism for these gripping devices comprises a series of short levers 65 at one end of each of the intermediate shafts 64. Rocking movement applied to shafts 64 is imparted to shafts 63 in the opposite direction by gears 63' (Figs. 1 and 2). The upper ends of levers 65 are swung to the left or right, to engage and disengage the gripping devices 61 and 62, by means of a horizontal rod 66 which is mounted for shifting movement in the frame 1, the levers being forked at their ends to straddle this rod and engage the spring mounted collars shown in Fig. 2. Rod 66 is biased toward the right by means of a compression spring 67 which tends to hold the grippers in position to grip the jars.

Rod 66 is actuated by means of a cam 68 (Fig. 11) on shaft 32. This cam engages a roller 69 mounted at the lower end of a yoke member 70 which is slotted to engage a guide block 70' mounted on shaft 32, and has at its upper end a link rod 71 which is pivotally connected at its upper end to an arm 72 extending horizontally from a short shaft 73 which is mounted in bearings in frame 1. On the opposite end of shaft 73 an upright forked lever 74 connects with the right end of rod 66, bearing against a collar which is fixed to this rod. The downward movement of link 71 by cam 68 which results in forcing rod 66 to the left (Fig. 2) to cause the gripping of the charge of jars (Fig. 6) is the first of the cycle of actions produced by the rotation of cam shaft 32.

The next action which takes place in the rotation of cam shaft 32 is the actuation of air valve 15 to release the fluid pressure in cylinder 17 and cause table 5 to return to its lower position. This action is by a cam 75 on shaft 32 located adjacent the one-revolution clutch 31 and keyed to bushing 38 (Fig. 2) which as mentioned before, is keyed to shaft 32. Cam 75 engages a roller 76 (Fig. 7) at the upper end of a two-armed lever 77 which is pivoted to a cross shaft 78, the lower end of this lever being connected through a link 79 with the rear end of valve spool 14 of air valve 15. When roller 76 rides into the depression in cam 75 link 79 is shifted to the right (Fig. 7) thus closing off the supply of fluid pressure to cylinder 17 and connecting it to an exhaust opening. A tension spring 80 biases roller 76 into engagement with the cam to cause this opening movement of the air valve. The pin and slot connection at the lower end of lever 77 permits this lever to be immediately reset by the cam without reopening air valve 15.

When desired to check the too rapid descent of case table 5, a spring-biased valve 81 may be operated by the lower end of a rod 82 fixed to the bottom of table 5 to close the exhaust opening near the bottom of the stroke and provide an air cushion within cylinder 17.

Substantially simultaneously with the descent of table 5, the stripping mechanism is operated to strip the shipping case and the partitions therein from the charge of jars 3 and maintain the case in contact with table 5 as it is lowered. This stripping mechanism, indicated generally by reference numeral 83, comprises a series of vertical rods 84 (Figs. 12 and 13) which are fixed to and project downwardly from a rectangular plate 85. At their lower ends rods 84 are provided with approximately rectangular button members 86 which contact the criss cross partitions 8 at their intersections. Supporting plate 85 is mounted at the lower end of a rack bar 87, the teeth of this bar being engaged with gear-teeth 88 at one end of a sleeve-gear 90 which rotates on a cross shaft 91 (Figs. 1 and 2). A roller 92 which turns loosely on a second parallel cross-shaft 93 maintains the teeth in engagement.

Gear 94 at the opposite end of sleeve 90 meshes with the teeth of a second rack-bar 95 which extends rearwardly to be operated by the teeth of a gear segment 96 which is fixed to a shaft 97 pivoted in frame 1. On the right end of shaft 97 is a short arm 98 to which the upper end of a link 99 is connected. This link is attached to a yoke member 100 which is slotted so as to slide upon a guide-block 101 on cam shaft 32. A roller 102 on one face of yoke 100 operates in the slot 103 of a face-cam 104 on the cam shaft, this cam serving to operate the stripper mechanism 83.

The article-removing carriage 10 moves forward underneath the charge of jars 3 suspended from the gripper-head 2 as soon as the case-table 5 descends to its lower position, as mentioned at the outset. The construction of the carriage 10 is shown in Figs. 1, 2 and 14-18. The carriage has two side frame plates 105 which are interconnected by means of two cross-bars 106 and one tie-bar 107, constituting together a rigid frame for the carriage. On the outer side of each of the side-plates 105 a rack-bar 108 is securely fastened, these having rack-teeth in their lower edges. Each rides on two gears 109 which are mounted on two parallel shafts 110.

Racks 108 are held in engagement with these gears by means of four flanged rollers 111, two on each side. Since gears 109 are keyed to their respective shafts 110, carriage 10 can roll freely forward and back on these gears. The movement of carriage 10 is derived from a face-cam 112 (Fig. 16) on main cam-shaft 32. The cam groove receives a roller 113 which is mounted on the side of yoke member 114, straddling shaft 32, and slotted to receive a guide block 115 on this shaft.

The upper end of yoke 114 terminates in rack-bar 116 having teeth which mesh with those of a small gear 117 fixed to a cross-shaft 118 located about midway between shafts 110. A roller 119 maintains the teeth of the rack and gear in engagement. The rotation of shaft 118 by the rack is transmitted to one of the shafts 110 by means of a large gear 118x keyed to shaft 118 and meshing with the teeth of a smaller gear 118y fixed to this shaft 110.

Accordingly, it will be understood that when cam 12 moves rack 116 upward, shaft 110 will be rotated to move carriage 10 forward, that is, to the left, as shown in Figs. 14-18.

Only the left portion of carriage 10 receives and removes the jars 3 from gripper-head 2. The shape of the side plates 105 is such as to raise this left portion approximately to the level of jar conveyer 9, while the right-end portion is at a lower elevation, so as to support the rack-bars in engagement with gears 109. Jars 3 are received by and supported on a series of parallel rails 120 of suitable yielding material such as "Micarta." These are mounted so as to be vertically shiftable to lower the jars free of gripping devices 61, 62 and to reduce the distance the jars have to drop when released; also in order that the rails may move beneath the flat plate 11 of the trough 12 onto which the jars are moved from the rails as carriage 10 moves back. As shown in Fig. 2, rails 120 are in their lower position which they occupy when the carriage is at its back or delivery position adjacent conveyer 9, which is shown in dotted lines in Fig. 1 and in full lines in Fig. 17. When the carriage is moved forward as shown in Figs. 14 and 18, rails 120 are elevated to the position shown in these figures.

Figures 14, 15, 16:
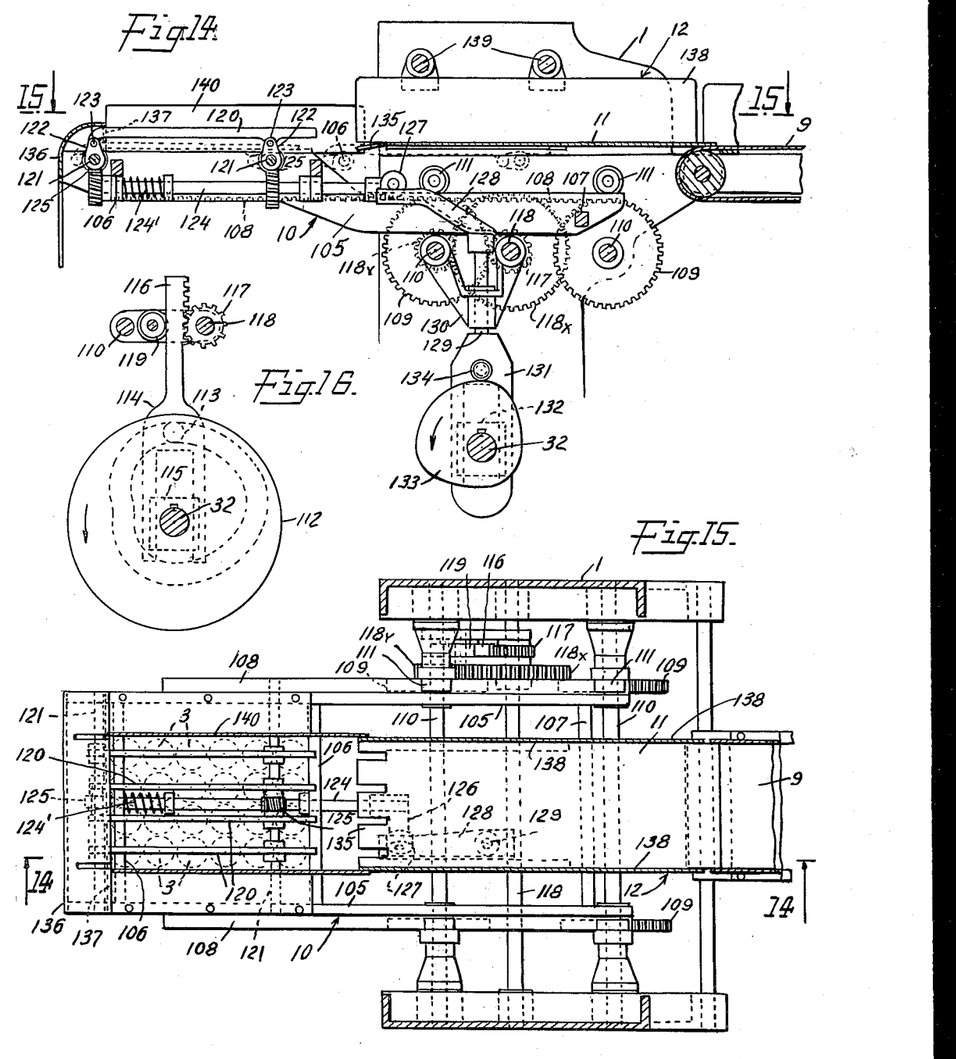
Fig. 14 is a vertical longitudinal section taken on line 14—14 of Figs. 2 and 15, showing the bottle-removing carriage.
Fig. 15 is a horizontal section taken on line 15—15 of Fig. 14.
Fig. 16 is a detail vertical section taken on line 16—16 of Fig. 2.

The mounting of rails 120 and the mechanism for operating such mounting to raise and lower the rails is shown more particularly in Fig. 14. Rails 120 are supported on two parallel cross-shafts 121 which are mounted for rocking movement in side plates 105. Each of these shafts has a series of rail levers 122 fixed to them, these levers being split on their ends for receiving the respective rails between them, the rails being pivotably supported on these levers by means of shafts 123. Shafts 121 are rocked 90° to raise the rails from the lower or dotted position of Fig. 14 to the higher or full line position.

Such rocking of shafts 121 is accomplished by means of a longitudinal shaft 124 which is connected to both of the shafts 121 by means of spiral gears 125, these gears being so arranged that by turning shaft 124 through an angle of 45°, cam 121 is rocked through an angle of 90°. Shaft 124 is mounted for turning movement in bearings which project downwardly from cross-bars 106, and is provided at its rear end with a short actuating lever 126 having a roller 127 at its end. As carriage 10 is moved forward from the position shown in Fig. 17, adjacent conveyor 9, just before it reaches the limit of its outward movement, that is, the position shown in Fig. 14, roller 127 engages the sloping surface of a cam member 128 and is moved upwardly, rocking shaft 124 45° and resulting in the raising of rails 120 to their upward position.

Figure 17:
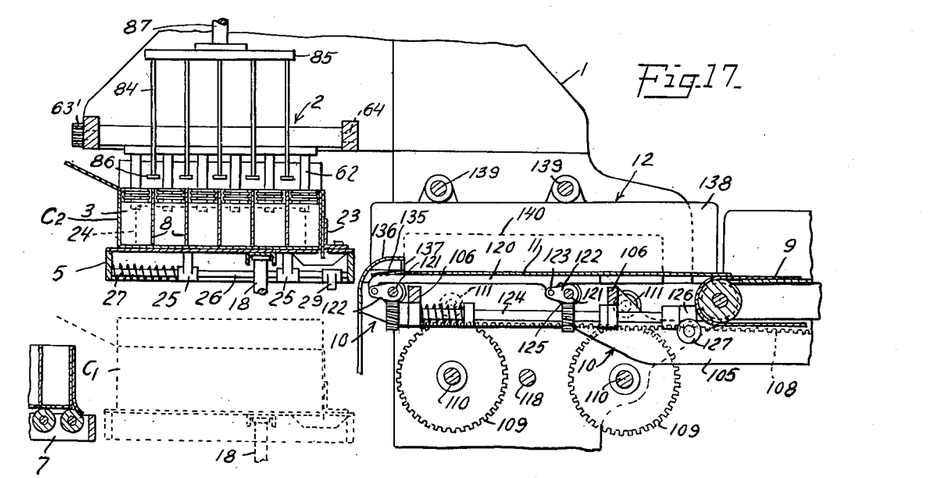
Figs. 17 and 18 are diagrammatic views, showing the case-elevating table and bottle-removing carriage in different positions.
Figure 18:
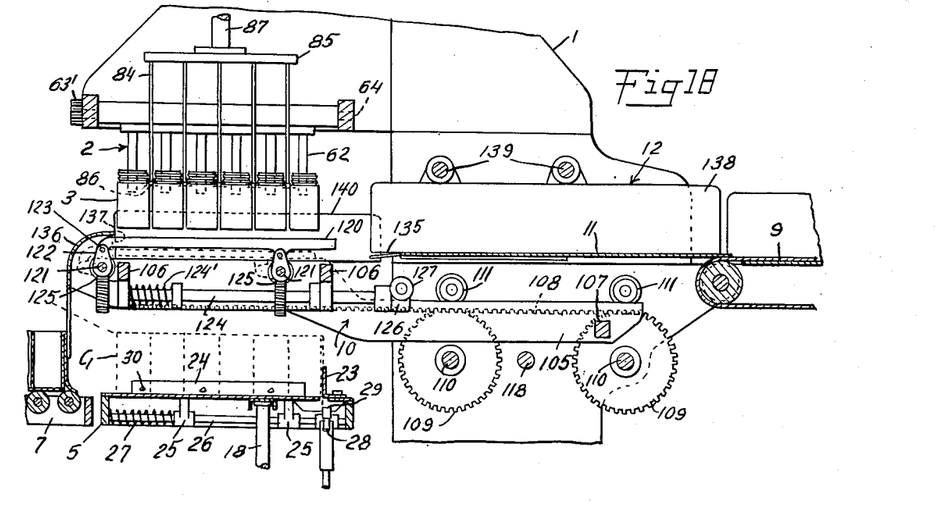

It is necessary to return rails 120 to their lower position before the jar-removing carriage 10 returns to its delivery position, shown in Fig. 17. In order to rock roller 127, and thus rock shaft 124 in the direction to lower rails 120, cam 128, which is in the form of a short section of angle bar, is permanently attached by welding or otherwise to the head of a vertically movable rod 129 (Fig. 14). Rod 129 slides in a guide opening in a V-shaped yoke member 130 which is supported on shaft 118 and front shaft 110, and the lower end of rod 129 is connected to operating yoke 131 slotted to receive a guide block 132 mounted on main cam shaft 32. A rail-lowering cam 133 fixed to this shaft cooperates with a roller 134 mounted on one side of yoke 131 so that by this construction cam 128 is lowered as cam 133 rotates from the position shown in Fig. 14. Roller 127 is held in contact with cam 128 by means of a torsion spring 124' which causes the rocking of the shaft 124 and the lowering of the rails with the jars upon them.

Now that the jars are lowered away from the internal gripping devices 61, 62 of gripper head 2, carriage 10 with the jars can move back to its former position, and does this under the action of cam 112, as previously explained. As the jars are carried toward the right on rails 120, they ride up on a series of sloping projections 135 at the left end of plate 11 which extend downwardly with a gentle slope, between the rails, their left ends being somewhat below the upper surfaces of rails 120 when in their lower or dotted position, as shown in Fig. 14. In order to move the jars over projections 135 and onto the surface of plate 11, a pusher plate 136 is fixed near the left end of carriage 10, plate 136 has a vertical shoulder 137 to engage the jars, and then is bent forward and curved downwardly, covering the rail-operating mechanism, and the lower end of this plate is arranged to engage the empty case on case table 5 and eject it therefrom onto conveyer 7 during the forward movement of carriage 10.

As mentioned, plate 11 forms the bottom of trough 12. This trough has side members 138 (Fig. 15) to guide the sides of the group of jars, and these side members are connected to hangers which are supported on two parallel cross-rods 139 fixed to the machine frame and constituting the support for the trough. Carriage 10 is also provided with upright sheet metal guides 140 on each side. These guides telescope with respect to the sides 138 of trough 12, as shown in Fig. 15.

The modified form of unloader shown in Figs. 19–25 will now be described. This form is constructed and arranged to handle bottles and to deliver them in separate parallel rows or lines. External, rather than internal gripping devices are required. The jar-supporting rails 120a on carriage 10a do not have to be lowered before the carriage moves back to delivery position. Except for the changes about to be described the apparatus is like that previously described.

Figures 22, 23, 24:
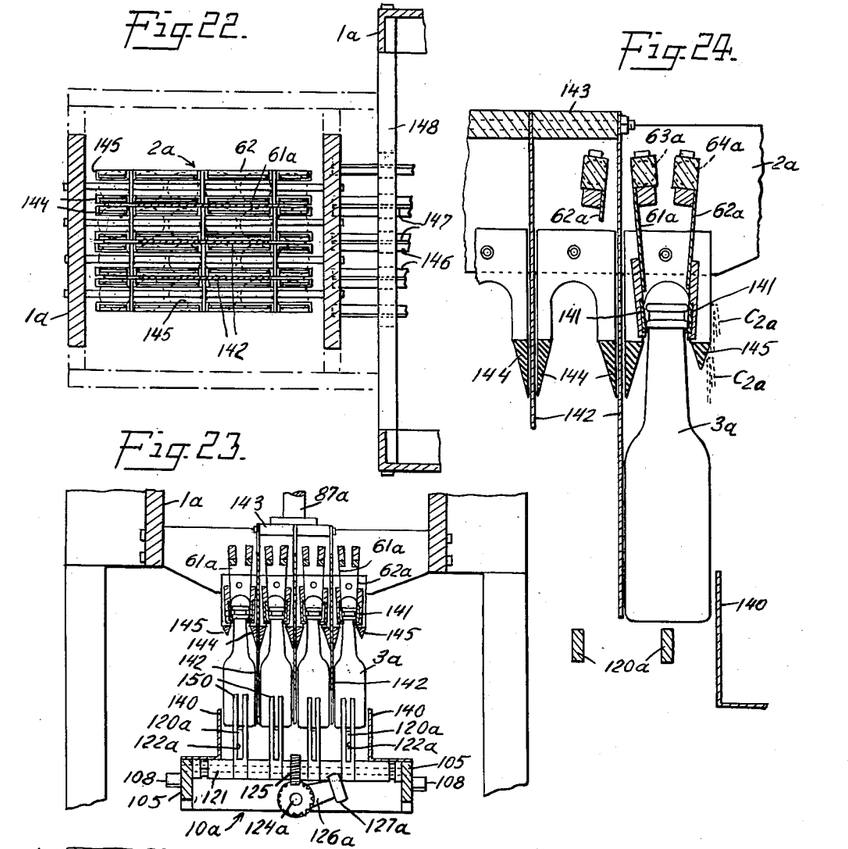
Fig. 22 is a horizontal section taken on line 22—22 of Fig. 19.
Fig. 23 is a vertical section taken on line 23—23 of Fig. 19.
Fig. 24 is an enlarged sectional detail of a portion of Fig. 23.
Figure 25:
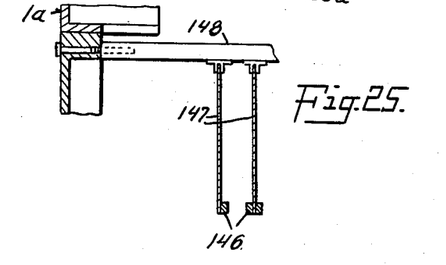
Fig. 25 is an enlarged detail section taken on line 25—25 of Fig. 19.

The external bottle-gripping devices of gripper-head 2a are shown in detail in Figs. 23 and 24. The flexible arms 61a and 62a are fixed at their upper ends to alternate and intermediate shafts 63a and 64a. At their lower ends arms 61a and 62a are provided with suitable gripping fingers 141 lined with resilient material of rubber, or the like, to firmly engage the exteriors of the necks of the bottles 3a. The size of the charge of bottles is the same as before, namely 24 bottles arranged in four rows of six each.

The bottle-gripping fingers 61a, 62a are operated in pairs from releasing to engaged position, and vice versa, by the rocking of shafts 63a, 64a in the same manner as previously described in connection with Figs. 1–18. Fingers 61a, 62a, however, are much wider than fingers 61 and 62 and in fact are placed edge to edge so as to form four substantially continuous rows of gripping devices instead of individual or separate grippers as is required when gripping internally. Hence, the bottle necks do not have to be placed carefully in alignment with any particular pair of grippers. Since the necks of the bottles do not have to be lowered below the bottoms of the grippers before carriage 10a moves to the delivery position, the bottle necks merely move between the rows of released or open gripping devices 61a, 62a.

The stripping mechanism differs from that previously described and instead of employing buttons mounted on a series of rods, stiff parallel plates 142 are used between the rows of bottles. Plates 142 are rigidly mounted upon a horizontal support 143 which is in turn mounted on the lower end of operating rack-bar 87a. Plates 142 extend downwardly from the support 143 between the several pairs of gripper-operating shafts 63a, 64a. The lower edges of the plates are in the same plane and engage the top of the case and force it free from the bottles. If the crisscross partitions ride up on the bottles they will also be engaged by stripper plates 142 and removed.

Stripper plates 142 move between pairs of bottle neck guide members 144 which are mounted in fixed position on the frame structure of gripper-head 2a. These bottle neck guides have inwardly tapering surfaces disposed below the lower ends of gripping fingers 61a, 62a and serve to guide the necks of the bottles accurately between these fingers. Slightly different neck guides 145 extend around the outside of gripper head 2a, being arranged with outer as well as inner sloping surfaces. The outer surfaces serve to guide the mouth of the case to position $C_{2a}$ as shown by the dotted lines in Fig. 24.

Figures 11, 12, 13:
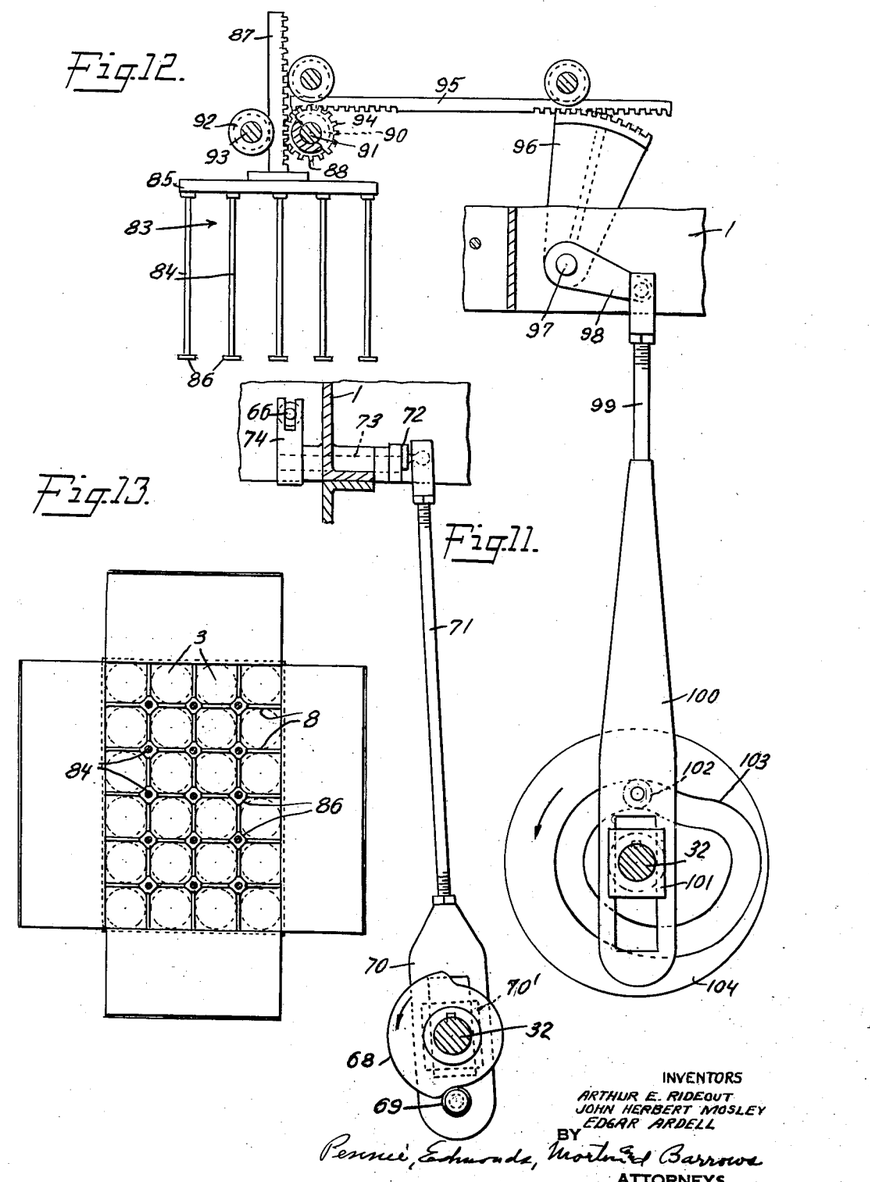
Fig. 11 is a vertical longitudinal section taken on line 11—11 of Figs. 2 and 3, showing the jar gripper head actuating mechanism.
Fig. 12 is a similar view taken on line 12—12 of Figs. 2 and 3, showing the stripper operating mechanism.
Fig. 13 is a horizontal section taken on line 13—13 of Fig. 2.
Figure 19:
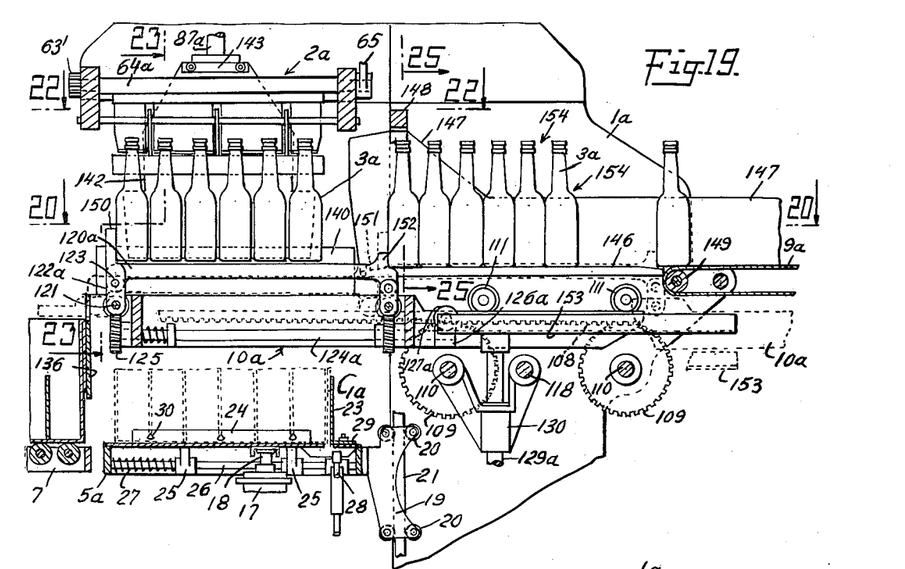
Fig. 19 is a view similar to Fig. 14 but including the bottle gripper head and the case-elevating table.

Stripping plates 142 are held in their lower position as shown in Figs. 19 and 23 until the bottle removing carriage 10a has moved back to its delivery position (Fig. 21) so that the plates may act as guides to maintain the bottles in rows as they are pushed out from beneath the gripper head. Accordingly in this form of the apparatus the cam (not shown) which operates the stripper mechanism will have a somewhat different shaped groove than stripper operating cam 104 (Fig. 12).

Instead of the trough 12 receiving the bottles at the delivery position of carriage 10a, the bottles are received on pairs of stationary supporting strips 146 which are secured along the lower edges of a series of spaced parallel guide plates 147. These plates are suspended at their left ends from a cross bar 148 forming part of the frame of the machine. They are also somewhat similarly supported at their outer ends (not shown) so as to maintain them in fixed spaced position.

Figure 20:
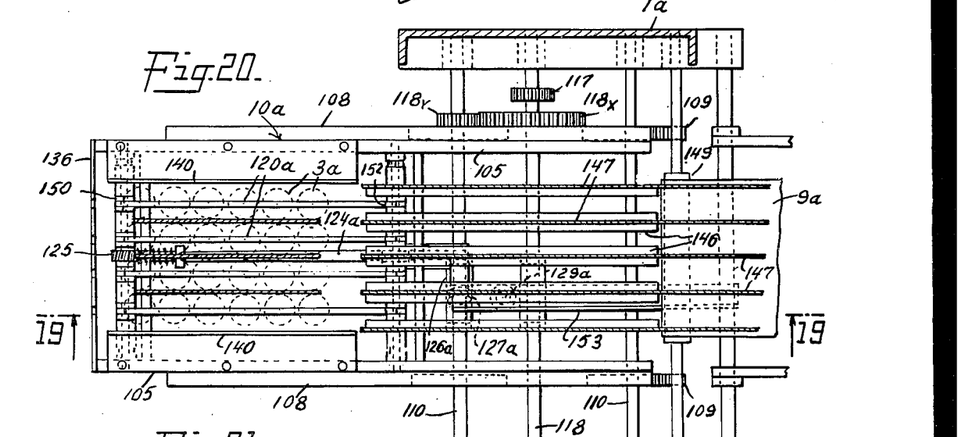
Fig. 20 is a horizontal section taken on line 20—20 of Fig. 19.

Supporting strips 146 are only of such length as to support a single charge of bottles each, as may be seen in Figs. 19 and 20. Beyond the ends of these strips the parallel guide plates 147 extend over a wide conveyer belt 9a onto which the bottles pass from strips 146 and from the outer end of which the bottles are delivered to the next operation or to a suitable conveyor. Conveyer belt 9a passes around an idler roller or drum 149 at its left end and is driven from its outer end which is not shown.

The bottle removing carriage 10a is constructed like carriage 10 except for changes in the arrangement for pushing the bottles onto strips 146, and in the mechanism for raising and lowering the bottle supporting rails 120a. Instead of the stationary pusher plate 136 with its bottle pushing shoulder 137 (Fig. 17), carriage 10a has a series of pivoted bottle pushing fingers 150 (Figs. 19, 20 and 23). These fingers are forked at their upper ends, being merely extensions of the left hand bottle rail levers 122a. Fingers 150 swing down with bottle rails 120a to the horizontal position as shown in dotted lines in Fig. 19 and swing up to vertical or bottle engaging position as shown in the full lines when the rails are raised.

Fingers 150 push the respective rows of the released charge of bottles from their position between the gripping devices of the gripper head 2a onto the stationary supporting strips 146, the forward ends of these strips being sloped as shown at 151, corresponding to the sloping fingers of the bottom of trough 12. The previous charge of bottles which has been placed on supporting strips 146 is pushed onto conveyer belt 9a by means of upward extensions 152 formed on each of the rails 120a at their right ends.

The raising and lowering of the bottle supporting rails 120a is accomplished, as in the apparatus of Figs. 1-18 by rocking movement applied to longitudinal shaft 124a through roller 127a (Fig. 23) on the end of actuating lever 126a. However, instead of applying the upward movement to roller 127a by means of sloping cam 128 as in the earlier described machine, both the up and down movement of the rails 120a is produced by the contour of the cam (not shown) which corresponds to rail-lowering cam 133. In other words, both movements are produced by an upward and a downward movement of vertical rod 129a (Fig. 9). For this reason a straight horizontal member 153 is mounted in the head of rod 129a in place of sloping cam 128. Member 153 extends to the right of Fig. 19 the whole length of travel of carriage 10a inasmuch as it is necessary to lower rails 120a before the carriage starts on its forward movement.

The operation of the apparatus shown in Figs. 19-25 is not unlike that of the machine shown in the previous figures. The operator opens up the flaps of the case while on the incoming case conveyer 4 and inspects the contents to make sure that all of the bottles are right side up, and then moves the case onto the case elevating table 5 and foot trips the lever 6. This opens the air valve 15 and causes table 5a to rise to the upper portion, placing the mouth of the case around the periphery of bottle gripper head 2a (case position C2a, Fig. 24) and bringing the necks of the bottles 3a between the open external bottle grippers 61a, 62a.

The arrival of case table 5a at the top of its stroke causes the tripping of one-revolution clutch 31 in the manner previously described, and the machine starts on its automatic cycle of operation. First of all the bottle grippers are actuated to grip the bottles. Then two events occur simultaneously, namely, the reversal of air valve 15 and the downward movement of stripping plates 142. As soon as the case table has reached its lower position, bottle removing carriage 10a commences to move forward from the position shown in Fig. 21, where bottle rails 120a are between the bottle supporting strips 146 and adjacent conveyer 9a. During this movement the empty case is ejected from table 5a onto case conveyer 4.

Figure 21:
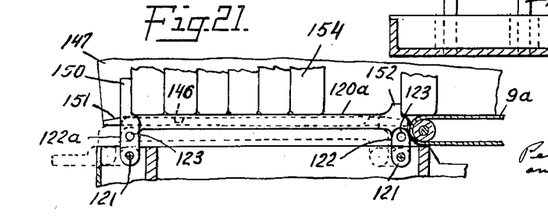
Fig. 21 is a view showing certain parts of Fig. 19 in different positions.

Just as this motion starts, the bottle rails 120a are swung downward from the full line position of Fig. 21 to the dotted position so that the bottle pushing members 151 and 152 as well as rails 120a will clear the bottom of the suspended charge of bottles. As soon as carriage 10a arrives at the forward position (Fig. 19), the rails and bottle pushers are swung up and the bottle gripping devices are released and the bottles drop a short distance onto rails 120a.

Thereupon carriage 10a moves back, rails 120a and the bottle pushing members remaining in their up positions, and the bottles are carried to the right, the necks of the bottles passing between the open gripping devices, and the bottles being pushed onto the bottle supporting strips 146 as previously described. During this movement the group of bottles 154 which, from a previous operation, have been placed on the supporting strips 146 are moved farther to the right onto the conveyor belt 9a. Stripper plates 142 now return to their up position and the cycle is ended, main cam shaft 32 having completed one revolution and having been stopped by the one-revolution clutch 31. The machine is now ready for the operator to place a succeeding case on table 5 and repeat the unloading operation.

Although the invention has been set forth by the disclosure of the construction and operation of two embodiments, it will be understood that other changes in construction and operation may be made without exceeding the scope of the invention which is set forth in the appended claims.

We claim:

1. In an apparatus for unloading articles from shipping cases, an off-bearing conveyor for the articles, a stationary article gripper head disposed in spaced relation to said conveyor and having article gripping devices constructed and arranged to releasably support suspended therefrom a charge of articles brought into charge-engaging position therebeneath with the bottoms thereof approximately level with said conveyer, means for moving a filled case to bring the articles therein into said charge-engaging position, an article removing carriage horizontally shiftable from a position below said gripper head to a delivery position adjacent said article conveyer, charge supporting means at said delivery position constructed and arranged to receive the charge from said carriage and support said charge substantially at the level of said conveyer, and means for actuating said carriage to transfer to said conveyor articles released by said gripper head, successive actuations of said carriage causing a charge of said articles to move first onto said support and then onto said conveyer.

2. An apparatus for unloading articles from shipping cases comprising an off-bearing conveyer for the articles, a stationary article gripper head having article gripping devices constructed and arranged to releasably support suspended therefrom a charge of articles brought into charge-engaging position therebeneath, said gripper head being disposed in laterally spaced relation to said conveyer and at an elevation such as to support the articles with the bottoms thereof approximately level with said conveyer, means for transferring said articles to said conveyer after release of the articles by said gripper head, a case elevating table operated from a case-receiving position to raise a filled case to bring the articles therein into said charge-engaging position, a support for filled cases disposed beside the case table when said table is in its receiving position, said table having a case-positioning member fixed thereon, a device pivoted on said table and biased into engagement with one side of the case on said table to clamp the case against said case-positioning member, and means operable on the descent of said table to case-receiving position to swing said device to a second position to serve as a scuff plate between said support and table.

3. An apparatus as set forth in claim 1, wherein the horizontaly shiftable carriage has a series of spaced parallel rails mounted thereon to support the articles, and mechanism for mounting said rails for bodily movement with respect to said carriage to raise and lower the rails with respect to the bottoms of the articles suspended from the gripper head.

4. An apparatus as set forth in claim 1, wherein the horizontally shiftable carriage has a series of spaced parallel rails to support the articles, mechanism for mounting said rails on the carriage comprising two rail supporting levers for each rail, said levers being pivoted on the carriage and to said rails, and means for simultaneously swinging said levers to impart bodily movement to the rails with respect to said carriage to raise and lower them with respect to the bottoms of the articles suspended from the gripper head.

5. An apparatus as set forth in claim 4, in which a bottle pushing finger is mounted to swing from horizontal to vertical position with one of the rail supporting levers of each rail.

6. An apparatus as set forth in claim 1, wherein a stationary flat plate is mounted to receive the articles from the horizontally shiftable carriage, the carriage moving under said plate as the articles are pushed off from the carriage and onto the upper surface of such plate.

7. An apparatus as set forth in claim 1, wherein the horizontally shiftable carriage has a series of spaced parallel rails to support the articles in rows, a series of article guides to receive the rows of articles from said carriage to maintain the articles in rows, a supporting strip being mounted between each pair of said guides to support the articles, the rails of said carriage moving alongside of said respective strips to deliver the articles thereto.

8. An apparatus for unloading articles from shipping cases comprising a conveyor for receiving the articles, a stationary article gripper head having article gripping devices constructed and arranged to releasably support suspended therefrom a charge of articles brought into charge-engaging position therebeneath, said gripper head being disposed in laterally spaced relation to said conveyer and at an elevation such as to support the articles with the bottoms thereof approximately level with said conveyer, a case supporting table below said gripper head, an article removing carriage horizontally shiftable from a receiving position below said gripper head to a delivery position adjacent said article conveyer, means for raising and lowering said table into and out of said charge engaging position, charge supporting means at said delivery position constructed and arranged to receive the charge from said carriage and support said charge substantially at the level of said conveyer, means for actuating said carriage to transfer to said conveyer articles released by said gripper head, successive actuations of said carriage causing a charge of said articles to move first onto said support and then onto said conveyer, said gripper head being provided with vertically movable stripping devices constructed and arranged to move downwardly substantially simultaneously with the lowering movement of the case table and acting to engage the case and partitions therein to remove them from the suspended charge of articles.

9. An apparatus as set forth in claim 8 in which the gripper head is provided with gripping devices arranged in rows and with stripping devices in the form of a series of parallel plates arranged to move downwardly between the rows of gripping devices substantially simultaneously with the downward movement of the case table to remove the case and partitions from the suspended charge of articles, and means for maintaining said stripper plates in their downward position until the article receiving carriage has removed the articles, said plates serving as guides to maintain the bottles in rows during such movement.

10. An apparatus as set forth in claim 8 in which a stationary flat plate is mounted to receive the articles from the article removing carriage, the carriage moving under said plate as the articles are pushed off from the carriage and onto the upper surface of such plate.

11. An apparatus for unloading articles from shipping cases comprising a conveyer for receiving the articles, a stationary article gripper head having article gripping devices constructed and arranged to releasably support suspended therefrom a charge of articles brought into charge-engaging position therebeneath, said gripper head being disposed in laterally spaced relation to said conveyer and at an elevation such as to support the articles with the bottoms thereof approximately level with said conveyer, a case supporting table below said gripper head, an article removing carriage horizontally shiftable from a receiving position below said gripper head to a delivery position adjacent said article conveyer, means operable while said carriage is in the delivery position to raise said table with a filled case thereon from a lower position below said conveyer to said charge-engaging position, means for actuating said gripping devices to support the charge of articles in said case, means for lowering said table to said lower position, means for thereafter shifting said carriage to said receiving position, means for operating said gripping devices to release said charge of articles onto said carriage, means for returning said carriage to said delivery position, and a cyclic mechanism for controlling the operation of said article gripping devices, said article removing carriage and said case table lowering means, the operation of said cyclic mechanism being initiated by the raising of the case table.

12. An apparatus as set forth in claim 11 in which the means for raising the case table is manually controlled.

13. An apparatus as set forth in claim 11 in which the cyclic mechanism includes a one-revolution clutch, said clutch being tripped by the case table near the top of the case-raising movement of said table.

14. An apparatus for unloading articles from shipping cases comprising a conveyer for receiving the articles, a stationary article gripper head having article gripping devices constructed and arranged to releasably support suspended therefrom a charge of articles brought into charge-engaging position therebeneath, said gripper head being disposed in laterally spaced relation to said conveyer and at an elevation such as to support the articles with the bottoms thereof approximately level with said conveyer, a case supporting table below said gripper head, an article removing carriage horizontally shiftable from a receiving position below said gripper head to a delivery position adjacent said article conveyer, means operable while said carriage is in the delivery position to raise said table with a filled case thereon from a lower position below said conveyer to said charge-engaging position, means for actuating said gripping devices to support the charge of articles in said case, means for lowering said table to said lower position, means for thereafter shifting said carriage to said receiving position, means for operating said gripping devices to release said charge of articles onto said carriage, and means for returning said carriage to said delivery position, said article removing carriage having a pushing device mounted thereon for ejecting the empty case from the case table during the shifting movement of said carriage to receiving position.

15. An apparatus as set forth in claim 1 wherein the horizontally shiftable carriage has a series of spaced parallel rails mounted thereon to support the articles in rows, a series of article guides to receive the rows of articles from the carriage to maintain the articles in rows, a supporting strip mounted between each pair of said guides to support the articles, mechanism for mounting said rails for bodily movement with respect to said carriage to raise and lower the rails with respect to the bottoms of the articles suspended from the gripper head, and means for actuating said mechanism to lower the articles onto said supporting strips.

ARTHUR E. RIDEOUT.
EDGAR ARDELL.
JOHN HERBERT MOSLEY.

References Cited in the file of this patent

UNITED STATES PATENTS

| Number | Name | Date |
|---|---|---|
| 1,858,619 | Delamere | May 17, 1932 |
| 2,452,927 | Hammen | Nov. 2, 1948 |